May 5, 1925.  F. L. O. WADSWORTH  1,536,461
AUTOMATIC TEMPERATURE CONTROL VALVE
Filed March 14, 1923
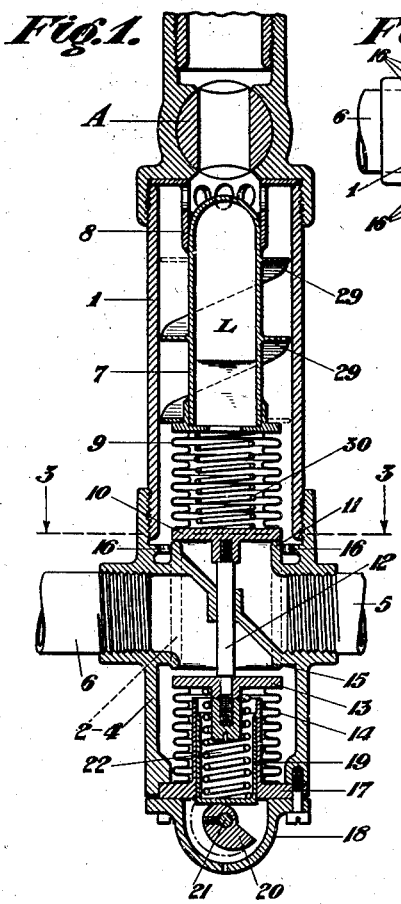
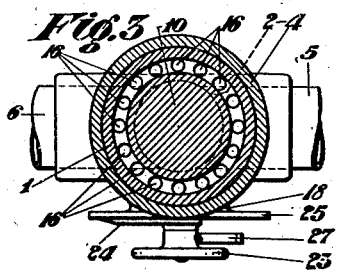
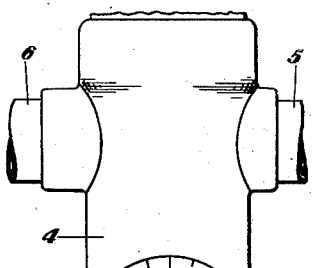
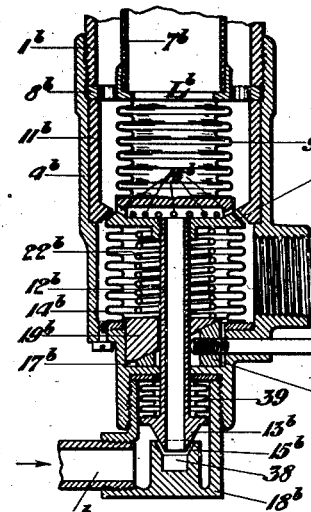
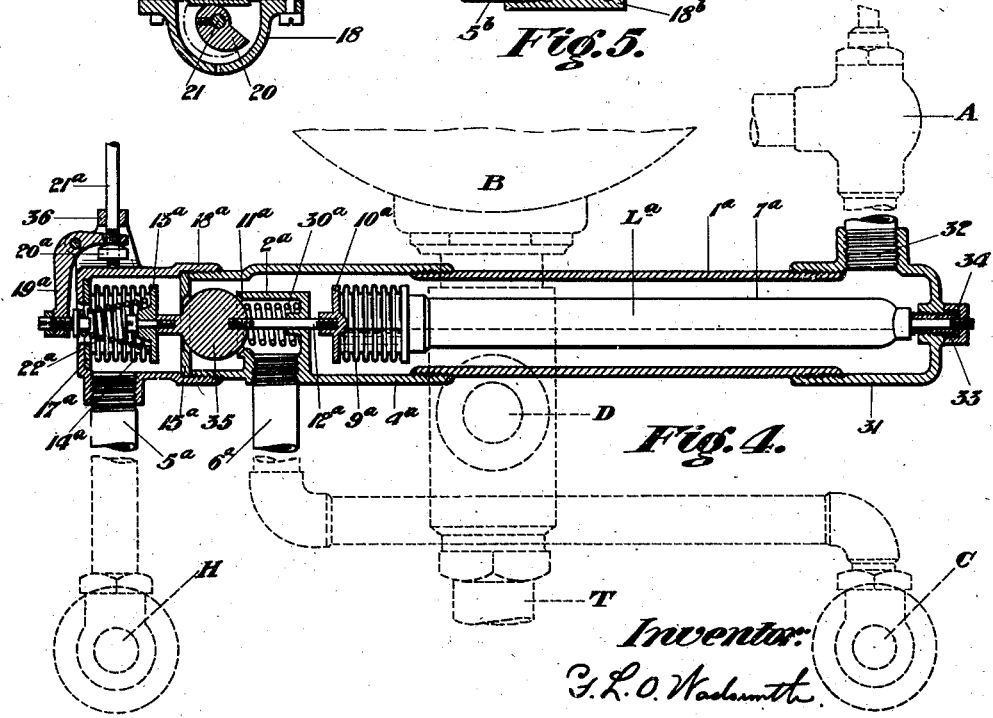
Inventor:
F. L. O. Wadsworth Patented May 5, 1925.

1,536,461

UNITED STATES PATENT OFFICE.

FRANK L. O. WADSWORTH, OF PITTSBURGH, PENNSYLVANIA.

AUTOMATIC TEMPERATURE-CONTROL VALVE.

Application filed March 14, 1923. Serial No. 625,050.

*To all whom it may concern:*

Be it known that I, FRANK L. O. WADSworth, a citizen of the United States, residing at Pittsburgh, Pennsylvania, have invented certain new and useful Improvements in Automatic Temperature-Control Valves, of which the following is a full, clear, and exact description, such as will enable others skilled in the art to which it appertains to make and use the same.

My invention relates to automatic control valves for regulating and governing the temperature of the fluids that are discharged therethrough; and one of the general purposes of the present improvements is to provide a combination of instrumentalities which will control the flow of a mixture of fluids, and which will automatically maintain the flowing mixture at a predetermined and preadjusted temperature, under varying conditions of supply and discharge. Another object of my invention is the provision of easily manipulated means whereby this automatically maintained temperature may be quickly and accurately adjusted to any desired degree, over a wide range, without interrupting or varying the pressure or the volume of the discharge from the valve structure, and whereby the maximum rise in temperature may also be definitely limited in the case of any failure of a part of the fluid supply.

More specifically stated, one of the particular purposes of these improvements is to provide a simple reliable and self contained valve organization which is capable of automatically controlling the mixture of hot and cold water that is supplied to wash basins, bath tubs, shower baths, laundry tubs, and similar appliances; and of maintaining that mixture at any desired constant temperature—or of immediately arresting the rise in temperature in case of a failure of the cold water supply—thereby eliminating all necessity for manipulation, or constant regulation, of separate faucets on the hot and cold water pipes, and also eliminating all danger of scalding, or injuring the hands or bodies of persons, particularly small children, who may be using such appliances. A further important feature of my improvements is the provision of various forms of construction, of the above described character, which are comparatively inexpensive, and which can be attached to, or installed in connection with, standard plumbing fixtures without changing existing piping connections, or requiring special and unusual arrangements of supply and discharge conduits.

Other objects and advantages of my invention will be made apparent, to those skilled in this art, by an examination of the three specific embodiments thereof, which are depicted in the accompanying drawings and are hereinafter more fully described; but these particular exemplifications are to be regarded as only illustrative of many other applications of my improvements to various uses—reference being had to the appended claims for the purpose of more fully defining the nature and scope of the invention. In these drawings:

Fig. 1 is a longitudinal section through one form of my improved "mixing valve" construction; Fig. 2 is a side, or front, elevation of the lower end of this structure; Fig. 3 is a horizontal section on the plane 3—3 of Fig. 1; Fig. 4 is another longitudinal section through a second exemplification of my improvements, and illustrates a construction that is particularly designed for use in conjunction with one of the standard forms of wash basin; and Fig. 5 is a partial sectional view of a third embodiment of the present invention as it may be used in conjunction with a steam condensation device for supplying hot water to washing machines, shop sinks, and other devices that may be installed in establishments where either live or exhaust steam is available for such purposes.

Referring now to the construction shown in Figs. 1, 2 and 3: 1 indicates a short length of standard pipe, which is coupled, at one end, to any suitable form of service supply valve, A, in the discharge outlet to a tub, shower bath or similar appliance; and which is connected, at its other end, to a double walled, or annular, casing 2—4 that is threaded, on opposite sides to receive the hot and cold water supply pipes 5 and 6. The pipe 1 contains a vapor thermostat, L, which comprises a rigid tubular cell 7, that is supported at its upper end by a perforated and flanged collar 8 (clamped in place between the end of the pipe 1 and the valve A), and which is provided with a flexible "sylphon" bellows, 9, that is attached to the lower end of the cell 7;—the bellows and cell being hermetically sealed and partially filled with a suitable volatile liquid (such, for example, as ethyl chloride, sulphuric ether, methyl alcohol or gasoline) which preferably "boils" at some temperature within the desired range of automatic control. The end plate of the bellows 9 constitutes a valve head 10, which is adapted to cooperate with a seat 11, at the upper end of the inner wall 2 of the casing 2—4, and thereby regulate the flow of hot water from the pipe 5 to the lower end of the pipe 1. This hot water valve head is rigidly connected, by the stem 12, with a second valve head 13, which forms the end plate of a "balancing" sylphon 14, and which cooperates with a reversely faced seat 15, at the lower end of the wall 2, in controlling the flow from the cold water pipe 6 into the bottom of the casing 4;—from which point the cold water passes upwardly through the annular space surrounding the wall 2 and through the row of openings 16, to the pipe 1. The sylphon 14 is attached to a flanged sleeve 17 that is clamped in place between the lower end of the fitting 4 and a cap 18; and this sleeve receives and guides an upright cup 19 which is supported on an eccentric cam 20 that is mounted on a cross shaft 21 in the said cap. A compression spring 22 is interposed between the head 13 and the bottom of the cup 19; and the shaft 21 is provided on its projecting end with a knurled wheel 23 by which the cam 20 can be revolved and the cup 19 thereby moved longitudinally in the sleeve 17 to vary the tension of this spring. The relative position of the cam and cup elements—and the corresponding degree of compression of the spring 22—is indicated by a pointer 24 which is secured to the shaft 21, and which moves over the graduated dial 25 on the side of the cap; and the clockwise rotation of the rotatable parts can be limited by the stop 26 and the screw pin 27 that can be set to hold the wheel 23 in any desired angular position on the shaft 21.

The operation of this device is as follows: When the valve A is closed, and there is no flow of water from the discharge pipe, the position of the internal control valves 10—13 will be determined by the temperature of the quiescent liquid surrounding the thermostat L; and since this temperature quickly approximates that of the surrounding air, the corresponding vapor pressure in the thermal control element is so low that the tension of the spring 22 will ordinarily suffice to keep the upper valve 10 in its fully opened position, and the lower valve 13 nearly or quite closed. When the discharge cock A is opened the greater portion of the liquid which first flows through the pipe 1 will therefore come from the hot water pipe 5; but as soon as the parts are heated, the vapor pressure in the thermostat will increase and move the connected valves 10—13 downwardly; thus restricting and dimishing the admission of hot water and simultaneously increasing that of cold water, until the relative inflow of the two currents is such as to maintain the mixture at the desired temperature. This temperature can be instantly varied over a wide range by revolving the cam 20 in a clockwise direction to increase the tension of the spring 22, (and thereby increase the temperature of discharge), or in a counter-clockwise direction (to lower the temperature of the mixture); and the maximum temperature of discharge may be definitely limited by adjusting the angular position of the wheel and pin 23—27 so as to bring the latter into contact with the safety stop 26 at any desired setting. This temperature adjustment does not affect or alter either the volume or the pressure of the outflow through the valve A; and, conversely, this outflow may be varied to any desired degree—within the conducting or discharge capacity of the system—by manipulating the valve A, without interfering with the action of the thermally controlled valves 10—13, and without affecting the automatic maintenance of the outflowing stream at the predetermined temperature for which the control mechanism may be set. Changes in pressure in the water supply pipes 5 and 6 are without effect on the operation of the device, since the compressive action of the water on the upper sylphon 9 is always exactly compensated by the reverse pressure on the balancing sylphon 14. And if the normal supply of cold water should be entirely cut off—by some external agency—the flow of hot water into the pipe 1 will be immediately checked, and ultimately stopped, by the continued expansion of the thermostat, L, and the resultant closure of the valve 10, before the temperature of the outflow, past the valve A, is sensibly increased.

It will be noted that the arrangement of the inlet openings to the lower end of the pipe 1 is such, that the thin sheet of hot water, which flows radially outward, past the edge of the valve 10, is at once intimately mingled with the multiple streams of cold water that flow directly upward through the orifices 16, 16; and the temperatures of the mixed currents are thus immediately equalized before they come in contact with the thermostat L. In some cases I may provide the periphery of the cell 7 with thin helically disposed "fins" or ribs 29, 29, which will serve to increase the sensitiveness of the thermostat—both by increasing its heat absorbing surface and also by increasing the path of contact between this surface and the flowing water—but this will only be necessary when a very close regulation of temperature is necessary or desirable.

The possible ranges of temperature control that can be obtained in the use of the above described mechanism, can be varied within very wide limits by a suitable choice of the volatile liquid or fluid which is placed in the thermostat L, and by a corresponding or accompanying alteration of the strength and initial tension of the spring 22. If the liquid chosen is one whose "boiling" point is higher than the desired minimum temperature of operation, the expansion of the thermostatic element must be assisted by a supplemental spring 30 which will balance, or partially balance, the atmosphere pressure on the open end of the lower sylphon 14. As shown in Fig. 1 this spring is positioned in the interior of the expansible bellows 9—between the lower end of the rigid cell 7 and the valve head 10—but it may be so placed as to act on any part of the valve assemblage 10—12—13 etc. But if the desired range of temperature is not too great, it is always possible to select a thermostatic liquid of such character as to render the use of a supplemental spring (such as 30) unnecessary; and any desired range of temperature can always be obtained—at some sacrifice of sensitiveness and power of thermostatic action—by dispensing with all liquid and filling the connected cell and sylphon members 7—9 with air or gas at suitable pressures.

The construction shown in Fig. 4 is, in all essential respects, the same as that illustrated in Figs. 1, 2 and 3. It comprises a tube $1^a$ which is attached at one end to the cap 31 that is threaded to receive the lateral discharge pipe 32; and which is coupled, at its other end, to the casing $4^a$—$2^a$ that is connected with the cold water supply pipe $6^a$. The tube $1^a$ contains the rigid cell element, $7^a$, of a vapor or gas thermostat $L^a$, which is fixed to the cap 31 by the adjustable screw and nut connections 33—34; and this cell terminates in a flexible sylphon element $9^a$ that projects into the adjacent end of the fitting $4^a$. The end plate $10^a$ of this sylphon is connected—by the stem $12^a$—with a ball valve 35, which is interposed between a seat $11^a$, on the inner wall $2^a$ of the casing $4^a$—$2^a$, and a removable seat $15^a$, that is clamped between the end of the outer wall of the said casing and a terminal elbow $18^a$. The valve 35 is rigidly attached to the end plate $13^a$ of a balancing sylphon $14^a$, that is mounted on the plate $17^a$ at the open end of the elbow $18^a$; and the outward movement of the connected parts $10^a$—$12^a$—35—$13^a$ (which is produced by the expansion of the thermostat $L^a$) is resisted by a spring $22^a$, interposed between the head $13^a$ and the long arm of an adjustable bell crank lever $19^a$ that is pivotally supported, in the forked bracket, 36, at one side of this same elbow member. The lever $19^a$ can be rocked on its pivotal support—to vary the tension of the spring $22^a$—by means of a coarse pitch screw and nut, $21^a$—$20^a$, which engage with the short arm of the said lever, and which are held in operative position with respect thereto by the arms of the bracket 36.

As here shown this second exemplification of my invention is mounted directly beneath the bowl of a wash basin B—back of the central drain and trap connections D, T—and is connected to the usual service pipes, H and C, in the following manner: The hot water faucet is removed and the corresponding service pipe H, is coupled directly (at $5^a$) to the elbow $18^a$. The cold water service pipe, C, on the opposite side of the basin, is cross connected—as indicated in dotted lines—to the inlet $6^a$. The outlet 32 is then connected to the basin tap A. The screw shaft $21^a$ is made of sufficient length to pass up through the opening for the valve stem of the hot water tap; and is provided, at the top, with a temperature indicator similar in form to that shown in Figs. 2 and 3. When the tap A is turned on the hot water flows into the device through the opening in the valve seat $15^a$; is mixed with the cold water that enters from the pipe $6^a$ and passes the valve seat $11^a$; and the mixed currents of liquid then pass through the annular space between the walls $2^a$ and $4^a$ into the tube $1^a$, and, thence through the outlet 32, to the discharge valve A;—the temperature of the outflowing stream being maintained at the desired point by the automatic action of the thermostat $L^a$ on the valve 35, and this automatically maintained temperature being readily changed by rotating the shaft $21^a$ to vary the tension of the spring $22^a$. If the flow of cold water, through the service pipe $6^a$, is arrested or interrupted by some external cause, the inflow of hot water will also be immediately checked—by the expansion of the thermostat and the accompanying movement of the valve 35 toward the seat $15^a$—before the temperature of outflow through the tap A is sensibly increased.

When the thermostat $L^a$ is partially filled with liquid—and the desired range of temperature control is very large—it may, in some cases, be necessary or desirable to supplement the vapor pressure in the sylphon $9^a$ by a spring $30^a$ which acts in opposition to the atmospheric pressure on the open end of the balancing sylphon $14^a$; but if the thermostat is filled with air or gas, at a suitable pressure, no such supplemental expansion element is necessary. It is also apparent that a suitable form of solid thermostat having a large temperature coefficient of expansion—such, for example, as the composite metal thermostats shown in

Fig. 3 of my earlier Patent No. 1,131,021, and Fig. 5 of my later Patent No. 1,146,826—may be substituted for the vapor or gas thermostat $L^a$ (or L) without changing in any way the action of the device; and in this alternative construction, the differential elements of the composite metal thermostat may be so arranged as to move the valve member in either direction—i. e., either away from the thermostat or toward it—when the temperature rises.

Fig. 5 illustrates a thermally regulated valve structure which is particularly designed for the automatic control of the mixture of a liquid with a hot vapor—such as steam—and the maintenance of that mixture at any desired temperature below that of the vapor itself. In this construction the lower extremity of the rigid thermostat cell $7^b$ is provided with a perforated collar $8^b$ which serves to support the said cell in fixed relationship to the enclosing tube $1^b$; and this flange also carries the expansible sylphon element $9^b$ of the thermosensitive control member. The free end of the sylphon $9^b$ is sealed to the face of a hollow (two-part) valve head $10^b$; and the beveled edge of this head cooperates with the reversely coned extremity of a sleeve $11^b$ which slips into the upper end of a T shaped casing $4^b$;—the collar $8^b$ and the sleeve seat $11^b$ being concurrently clamped in place by screwing this casing onto the lower end of the tube $1^b$. The chamber in the hollow valve head $10^b$ is provided with a series of radial orifices $16^b$ which open into the annular space above the lower end of the sleeve $11^b$; and this chamber is also in communication—through the hollow valve stem $12^b$—with a central recess 38 in the elbow cap $18^b$ that is screwed into the lower end of the casing $4^b$. The lower end of the valve stem $12^b$ is enlarged to form a head $13^b$, that cooperates with a conical seat $15^b$ on the edges of the recess 38 and thus serves to control the flow of fluid from the vapor inlet pipe $5^b$ to the recess 38, and thence, through the hollow stem and valve members $12^b$—$10^b$ and the orifices $16^b$, to the lower end of the thermostat chamber, where it is mixed with the liquid that enters the casing $4^b$ through the lateral connection $6^b$ and passes therefrom through the valve opening $10^b$—$11^b$. Any direct leakage of hot high pressure vapor, from the interior of the elbow cap $18^b$ into the casing $4^b$, is prevented, by surrounding the lower end of the stem $12^b$ with a flexible sylphon "packing" sleeve 39, that is sealed, at one end, to the valve head $13^b$, and is clamped, at its other extremity, between the engaged members $4^b$—$18^b$; and the upper part of this stem is also enclosed by a third sylphon element $14^b$ that is sealed, at its opposite ends, to the lower face of the valve head $10^b$ and to the bottom of the casing $4^b$;—the interior of both sylphons 39 and $14^b$ being open to the external air, and therefore exposed only to atmospheric pressure. The cross-sectional area of the sylphon $14^b$ is approximately equal to the combined areas of the two sylphons $9^b$ and 39; and when the device is in normal operation, the fluid pressures on these two smaller vessels—which tend, in this case, to aid the expansion of the thermostat $L^b$—are substantially balanced by the opposing liquid pressure on the larger flexible vessel. In order to restrain and regulate the action of the thermostatic control mechanism, a suitable spring $22^b$ is interposed between the upper valve head $10^b$ and a wedge shaped block $19^b$ that is seated in a recess $17^b$ at the base of the box $4^b$; and this block can be moved up and down in this recess (to increase, or decrease, the tension of the spring $22^b$) by means of a wedge shaped nut $20^b$ and the screw shaft $21^b$. This shaft is extended out to any suitable point on the pipe $6^b$, and is provided at its outer extremity with an indicating pointer and dial $24^b$—$25^b$ (similar to those shown in Figs. 2 and 3) and with an adjustable handle $23^b$ which will serve both to rotate the shaft $21^b$ and also stop that rotation (by contact with the adjacent portion of the pipe $6^b$) at any desired setting.

The operation of this third exemplification of my improvements is essentially the same as that of the previously considered embodiments, and will therefore be readily understood without further detailed explanation, but this last described construction presents one additional characteristic of "safety" action, which has some features of advantage when high pressure steam is used as one of the components of the heated mixture. It will be noted that the valve arrangement here shown is such that the flow of fluid through the valve openings is in the direction of valve closure—or just the reverse of the arrangements shown in Figs. 1 and 4—and under such circumstances the velocity pressures on the back of each valve ($10^b$ or $13^b$) tends to assist the action of the thermostatic control elements ($L^b$—$22^b$) in moving that valve toward its seat. As long as the system is in normal operation this tendency is largely, or wholly, neutralized by the mutual "balancing" action of the mechanically conjoined sylphon elements $9^b$—39 and $14^b$; but if the supply of cold water should be accidentally shut off—or reduced to such an extent as to prevent complete condensation of the steam as it issues from the orifices $16^b$—the upward pressure on the central sylphon $14^b$ will be reduced, and the system will be "unbalanced" to such an extent as to permit the steam valve $13^b$ to be immediately closed (without any aid from the thermostat); and this valve will then be positively held to its seat, by the pressure of steam behind it, until the normal conditions of water supply and water pressure have been reestablished in the system. Any accidental escape of live steam, or uncondensed vapor, from the apparatus is thus prevented—even if the thermostat itself should fail to act when the water supply is cut off or greatly reduced in pressure—and all danger due to such escape is avoided. It is, of course, obvious that the valve system of the liquid mixers shown in Figs. 1 and 4 might also be readily rearranged in such manner as to make the flow through the valve openings coincident with the direction of valve closure—in which case the failure of the cold water supply would immediately effect the closing and locking of the hot water control valve, or vice versa, (independently of thermostatic action)—but where liquids only are to be handled this additional flow, or velocity pressure, control is generally unnecessary; and it has the disadvantage of rendering the thermostatic regulation somewhat more sluggish at the extreme limits of the valve movement.

With the preceding disclosure as a guide engineers and others familiar with the use of heating apparatus of various kinds will be enabled to utilize my improvements, in whole or part as may be desired, in many different forms of construction; and to modify or alter the specific structures herein described—in order to best adapt them to various other uses — without essentially changing the generic functional character of my improved organization.

What I claim is:

1. An automatic temperature control mechanism for mixing apparatus which comprises a thermostat, means for balancing the external pressure thereon and thereby eliminating the effect of pressure variations in the surrounding medium on its thermal movements, a spring for assisting the expansion of the said thermostat as the temperature rises, a second spring for resisting said expansion movement, and manually operable means for varying the tension of the last mentioned spring.

2. An automatic temperature control mechanism for mixing apparatus which comprises a set of opposed and pressure balanced collapsible vessels, a rigid container hermetically sealed to one of said vessels and constituting therewith a fluid thermostat cell, an adjustable spring acting on the other of said vessels, and a double headed valve interposed between the opposed ends thereof and adapted to be moved in one direction by the expansion of the thermostat cell and in the other direction by the tension of the aforesaid spring.

3. An automatic temperature control mechanism for mixing apparatus which comprises a rigid container hermetically connected to an expansible vessel and forming therewith a fluid thermostat cell, a second expansible vessel having a pressure area substantially equal to that of the first vessel, an adjustable spring acting to expand the said second vessel, and a two seated valve member interposed between the aforesaid vessels and adapted to be moved in opposite directions by the respective expansions thereof.

4. A mechanism for automatically stabilizing the temperature of mixed fluids which comprises, a plurality of valve elements for controlling the inflow of the said fluid to the mixing chamber, a rigid container mounted in fixed position in the said chamber, an expansible vessel hermetically connected with the said container and forming therewith a fluid thermostat cell, an opposed expansible vessel having a pressure exposed area substantially equal to that of the first vessel, a spring acting to expand said second vessel, and connections between each of the said vessels and the aforesaid valve elements and acting to move the latter in opposite directions by the respective expansions of the opposed vessels.

5. An automatic mixing apparatus which comprises the combination of a reservoir, a plurality of supply passages leading thereto, a plurality of valve elements for controlling the flow area of the said passages, a rigid container mounted in fixed position in the said reservoir, a flexible vessel hermetically connected to the said container and forming therewith a closed thermostatic cell, means for balancing the fluid pressure in the reservoir on the flexible element of the thermostat, other means for balancing the expansion pressure in the thermostatic cell at any predetermined temperature, and connections between the said cell and the said valves and acting to move the latter in opposite directions as the temperature in the said reservoir rises and falls.

6. An automatic mixing apparatus which comprises the combination of a mixing chamber, a plurality of supply passages leading thereto, a valve assemblage for cooperatively and coincidently varying the flow area of the said passages, a manually controlled valve for regulating the volume of outflow from the said chamber, a rigid container secured at one end to the wall of the chamber, a flexible vessel hermetically connected to the other end of the said container and forming therewith an expansible thermostatic cell, connections between the said cell and the said valve assemblage for moving the latter when the temperature in the mixing chamber varies, and means for balancing the effect of pressure variations in the said chamber on the flexible element of the thermostat and thereby eliminating the effect of such variations on the thermostatically controlled valve movements.

7. An automatic mixing apparatus which comprises the combination of, a tubular mixing chamber, a manually operable valve controlling the discharge of fluid therefrom, an inner tube rigidly attached to one end of the tubular mixing chamber adjacent to the discharge outlet therefrom, a flexible vessel hermetically connected to the free end of the inner tube and forming therewith a fluid thermostat cell, a plurality of inlet openings for admitting fluid to the mixing chamber at points adjacent to the said flexible vessel, and a valve assemblage operatively coupled to the said thermostatic cell and serving to vary the flow area of the said inlet passages in accordance with the temperature of the fluid in the mixing chamber.

8. A self contained mixing apparatus for plumbing fixtures which comprises, a discharge fitting provided with a manually controllable outlet valves, a tubular mixing chamber attached at one end to said fitting and containing a centrally positioned thermostat, a valve box secured to the opposite end of the said mixing chamber and provided with a plurality of inlet passages for admitting fluid thereto, a plurality of valve elements operatively connected to the said thermostat and acting to simultaneously vary the inlet area of the said passages, an elastic restraint member acting on said interconnected valve elements in opposition to the expansion movement of the thermostat, and means for varying the tension of the said elastic restraint.

9. A self contained temperature controlled mixing apparatus for hot and cold water which comprises a valve box provided with a plurality of inlet openings and with an interconnected series of valve elements for controlling the flow area thereof, a tubular mixing chamber attached at one end to the said valve box and at the other to a valve controlled discharge fitting, a rigid inner tube secured at one extremity to the discharge end of the mixing chamber and provided at its free end with an elastic sylphon vessel, means conjoining said vessel with said interconnected valve elements, and other means for elastically controlling the movements of the conjoined parts as the temperature in the mixing chamber is varied.

In testimony whereof I have hereunto set my hand.

FRANK L. O. WADSWORTH.